June 10, 1947.   J. J. MAGUIRE   2,422,027
METHOD OF MAKING INSOLES
Original Filed May 26, 1942   2 Sheets-Sheet 1
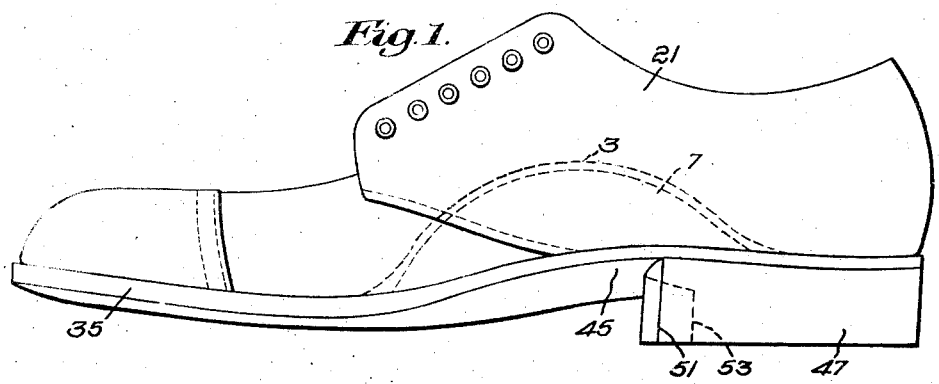
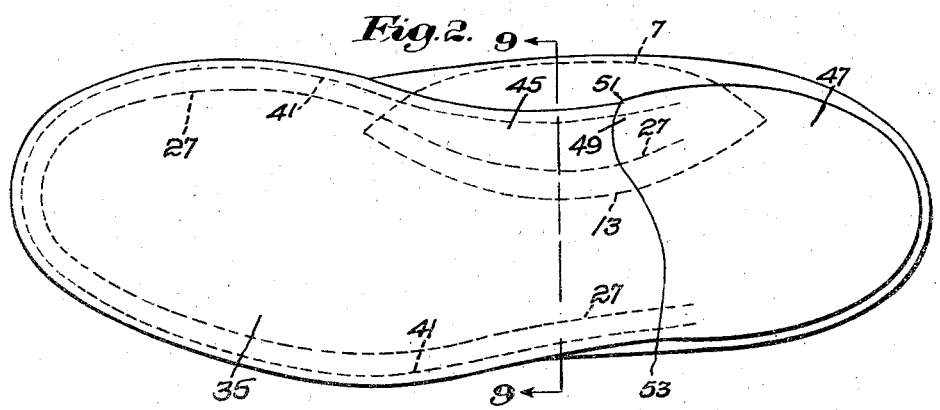
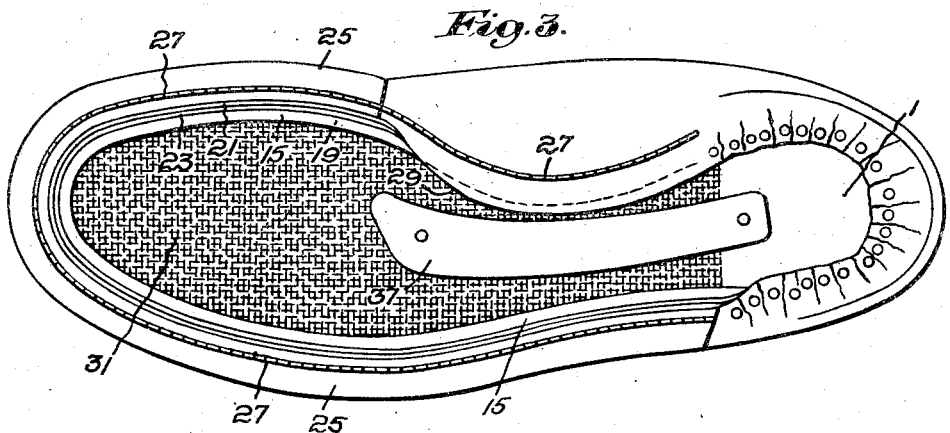
Inventor:
John J. Maguire,
by Emery Booth Townsend Miller Wilcox Attys June 10, 1947.  J. J. MAGUIRE  2,422,027
METHOD OF MAKING INSOLES
Original Filed May 26, 1942  2 Sheets-Sheet 2
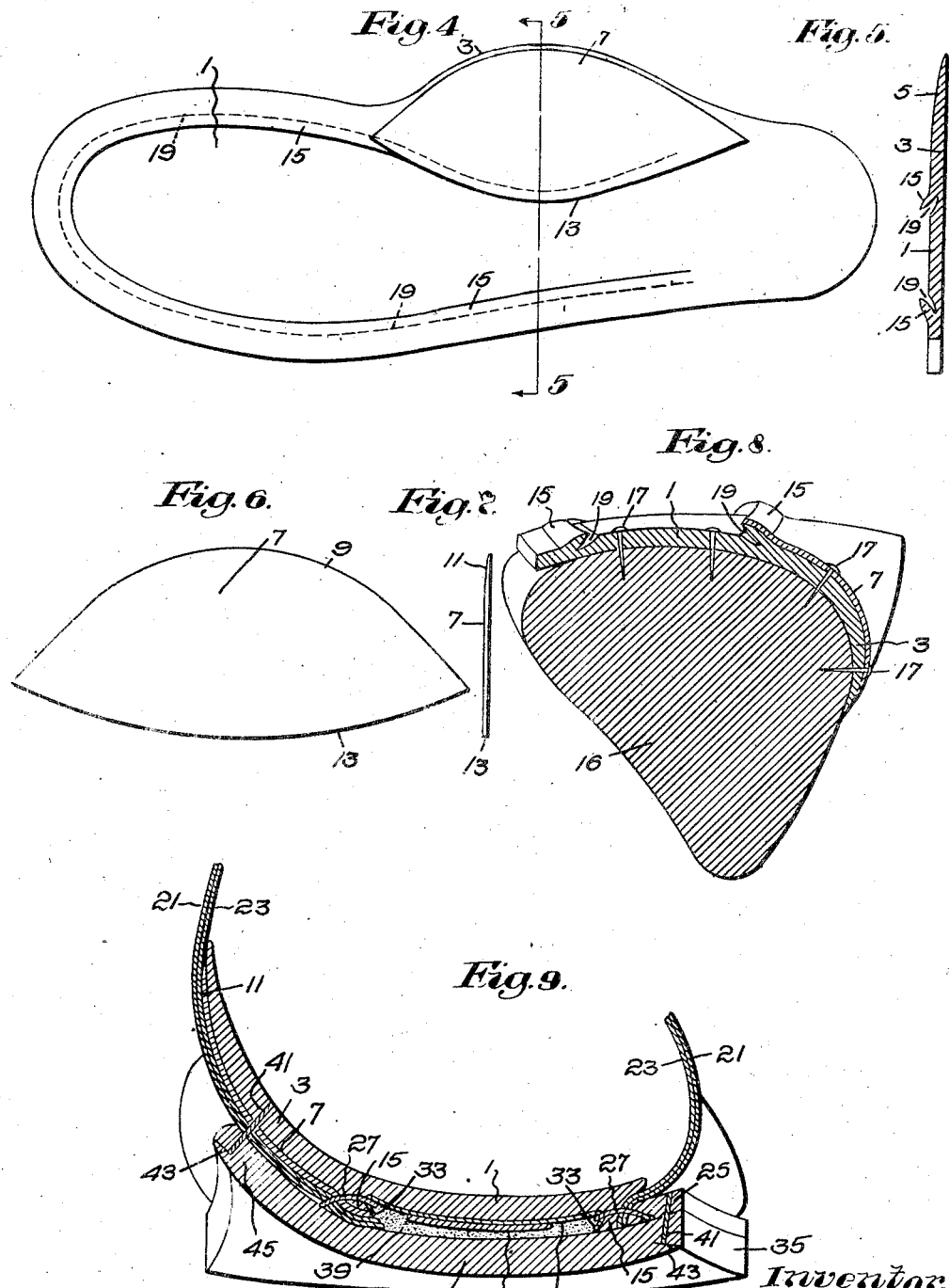
Inventor:
John J. Maguire Patented June 10, 1947

2,422,027

UNITED STATES PATENT OFFICE 2,422,027

METHOD OF MAKING INSOLES

John J. Maguire, Brockton, Mass., assignor to Field and Flint Co., Brockton, Mass., a corporation of Massachusetts Original application May 26, 1942, Serial No. 444,499. Divided and this application February 15, 1946, Serial No. 647,699

1 Claim. (Cl. 12—146)

My invention relates to methods of making insoles, the present application being a division of my copending application Serial Number 444,499, filed May 26, 1942 which has matured as Patent No. 2,397,361 of March 26, 1946.

The invention, which has among its objects an improved method of making an insole, will be best understood from the following description when read in the light of the accompanying drawings, while the scope of the invention will be more particularly pointed out in the appended claim.

In the drawings:

Fig. 1 is a side elevation of a shoe embodying an insole made by the method according to the invention;

Fig. 2 is a bottom view of the shoe according to Fig. 1;

Fig. 3 is a bottom view of the lasted shoe before the filler, outsole and heel are applied;

Fig. 4 is a flat development of the insole of the shoe according to Figs. 1, 2 and 3 as viewed from the bottom of the insole, the outline of the insole being that of the same as cut from the so-called "blocker";

Fig. 5 is a section on the line 5—5 of Fig. 4 with the form retaining layer for the so-called "cookie" of the insole omitted;

Fig. 6 is a plan of a sheet employed for forming the form retaining layer in molding the cookie of the insole;

Fig. 7 is an end elevation of the sheet according to Fig. 6;

Fig. 8 illustrates a step in the method of molding the cookie of the insole; and Fig. 9 is a section on the line 9—9 of Fig. 2.

The insole 1 of the shoe preferably is formed of leather, and is cut to provide, on its inner side at its shank portion, a laterally projecting cookie 3, the cookie being scarfed at its under side as positioned in the shoe, as clearly indicated at 5 (Fig. 5), to taper it toward its outer edge.

Heretofore insoles provided with cookies have been made of grain leather, the grain side being positioned uppermost in the shoe. The cookie of a grain leather insole may be molded to shape, that is to say, caused to curve outwardly and upwardly, as viewed in Fig. 9, and permanently retain such shape, either by tempering it and permitting it to dry when applied to the last or by molding it to shape by means of heated dies which have the effect of baking the tempered leather.

In the shoe illustrated the insole is made of split leather, which material cannot be satisfactorily molded in the ways above described, particularly in respect to securing a cookie with sufficient stiffness and rigidity properly to retain its shape and support the shank of the foot. According to the present invention, for causing the cookie portion of the insole to maintain its shape it has applied thereto a stiff form retaining layer 7 of sheet material, which layer preferably is applied to the outer side of the cookie as shown in Figs. 8 and 9.

As a suitable material for the layer 7 applicant preferably employs a fabric of woven material such as thick cotton cloth, say about 0.03 inch thick, which, if desired, may be of several plies, or of structureless material such as felt or matted cellulose fibers, in either case the material being impregnated with a substance capable of being treated for stiffening it. The material may be made by taking a sheet of the fabric and dipping it in a solution or dispersion of substance insoluble in water so as to impregnate it with the solution or dispersion. The fabric as soon as it is impregnated with the solution or dispersion may be removed from the vessel containing the latter, and then immediately and before it dries be placed in water so that the water may displace the solvent liquid and precipitate the dissolved or dispersed substance. This dissolved or dispersed substance of the impregnating solution or dispersion may, for example, be of such material as nitrocellulose, or various gums such as Manila, copal, kauri, sandarac, or common resin, all of which are insoluble in water, and may be dissolved or dispersed in a suitable liquid medium such as alcohol, acetone, ether, ammonia solution, etc., depending upon in which the particular material is soluble. Reclaimed Celluloid dissolved in ethyl alcohol, or nitrocellulose dissolved in acetone, to make a solution having the consistency of ordinary thin varnish will give satisfactory results. The stiffness of the final treated sheet may be controlled by dissolving into the solution small amounts of ordinary or refined resin. After the liquid contents of the impregnating solution are displaced by water the substance is precipitated in substantially colloidal form throughout the interstices of the cloth, felt, or the like. The material so treated may then be squeezed and dried to remove any residual liquid.

The dried sheets above described are flexible, non-tacky and porous and may be readily cut to the desired outline, the presence of the precipitated substance acting to prevent raveling or the like which would otherwise occur with untreated cloth or the like were it attempted to cut and skive it.

The dried sheet may then be cut to the approximate shape shown in Fig. 6, its upper curved edge 9, which when the sheet is applied to the insole is slightly spaced from the edge of the cookie as shown in Fig. 1, being slightly scarfed as indicated at 11 (Fig. 7), while its lower edge 13 preferably is so cut as to conform to the inner edge of the channel lip 15 at the inner side of the shank of the insole. The blank so cut may then be dipped in a suitable mulling liquid consisting of a solvent for the precipitated particles as, for example, where reclaimed Celluloid is used the mulling solution may be ethyl alcohol, or a mixture of toluol and ethyl alcohol, and, if desired, may contain a small amount of acetone to secure quick drying. The action of the solvent causes the finely divided precipitated particles almost instantly to coalesce and the dipped blank to be resolved into a flaccid tacky sheet, the coalesced particles at the surface of the sheet acting as a cement for securing it to the cookie when applied thereto.

The insole, with the mulled layer 7 thus applied to the cookie, before the layer dries may be applied to the last 16 and secured thereto as by tacks 17 (Fig. 8) and the layer allowed to dry. When dry the layer becomes non-tacky, hard and stiff, and retains the shape of the portion of the last to which the cookie has been applied after the tacks 17 extending through the cookie are removed preliminary to the drawing-over operation. It will be understood that the mulled layer 7 may, if desired, be applied to the cookie after the latter is applied and secured to the last, the tacks 17 extending through the cookie in such case being passed through the marginal portion thereof beyond the outer edge of the layer 7. In this way it has been found that the cookie of a split leather insole may be given the requisite stiffness and caused to retain its shape, being in these respects superior to the cookie of a grain leather insole as heretofore molded.

As shown, the insole channel 19 which forms the lip 15 extends continuously from the heel portion on the outer side of the shoe around the toe portion and terminates at the heel portion on the inner side of the shoe. The upper, which as illustrated comprises the outer leather layer 21 and lining 23, may be drawn over the last and secured thereto temporarily in the usual manner. A welt 25 may then be applied and secured to the channel lip by the inseam comprising the line of lock stitches 27 which pass through the welt, the upper, and lip 15. As shown, the welt extends from the heel portion on the outer side of the shoe around the toe and terminates at the forward end of the shank portion on the inner side of the shoe. As shown, the line of stitches is continued, preferably as part of the same stitching operation, from the terminal point of the welt at the inner side of the shoe across the shank portion at that side to secure the adjacent edge portion of the upper to the insole, as indicated in Figs. 3 and 9. The excess material of the upper and channel lip along the welt may then be trimmed off in the usual manner except that at the shank portion at the inner side of the shoe the upper edges 29 may be left with suitable margin beyond the inseam to secure the requisite amount of strength in the upper at these portions.

Preferably the insole has cemented to it at its under side between the opposite sides of the channel lip a reinforcing layer 31 of canvas or the like, this canvas having downturned edges 33, as indicated in Fig. 9, for reinforcing the channel lip, through which flanges the stitches 27 of the inseam extend, the canvas sheet thus also acting to tie together the portions of the upper at opposite sides of the shoe and avoid transverse stretching of the split leather insole. When the layer 31 is employed it is cemented to the insole preferably before securing the latter to the last.

Also the layer 7 preferably extends over the adjacent portion of the channel lip to reinforce it and also, for a purpose hereinafter pointed out, to cause the stitches of the inseam to pass through the edge of this layer.

The outsole 35 is applied after the shank stiffener 37 and the usual filler 39 are applied to the insole cavity. The outsole is secured to the welt by a line of outseam lock stitches 41 which pass through the welt and the portion of the outsole above the split 43 extending about the entire edge of the outsole forwardly of the heel portion. The line of stitches 41 is continued, preferably as part of the same stitching operation, from the terminus of the welt on the inner side of the shoe across the shank portion at that side to the heel portion of the shoe and, as shown in Fig. 9, the stitches extend through the cookie and the adjacent portions of the upper and layer 7 to the inner side of the cookie.

The outsole at the inner side of the shank, as shown, has a laterally projecting portion 45 which curves upwardly well about the cookie, as best illustrated in Fig. 9. The heel 47 of the shoe, as shown in Figs. 1 and 2, has a forwardly projecting portion 49 at the inner side of the shoe which extends under the rearward portion of this raised portion of the outsole so as to act to support it, the vertical outer corner 51 of this projecting portion of the heel being much higher than the corresponding corner 53 of the heel at the outer side of the shoe, as best illustrated in Fig. 1.

As shown, the rearward portions of the cookie 3 and the stiff form retaining layer 7 cemented to it are positioned between the insole and the projecting portion 49 of the heel considering the heel portion of the outsole as operatively part of the heel. Securing the lower edge of the stiff form retaining layer 7 to the channel lip 15, and having the line of stitches 41 well spaced from the line of stitches 27 at the cookie, in conjunction with the upwardly curved projecting portion 45 of the outsole, forms a rigid support for the base portion of the cookie, as does likewise the projecting upwardly curved portion of the outsole beneath that portion. Having the forwardly projecting portion 49 on the heel aids in supporting the arch of the foot of the wearer, and having the rearward edge of the cookie and the supporting layer 7 operatively between that portion of the heel and the insole aids in adding rigidity to the cookie and in properly supporting the foot of the wearer.

It will be understood that, within the scope of the appended claim, wide deviations may be made from the form of the invention described without departing from the spirit of the invention.

I claim:

The method of molding the cookie of an insole which comprises maintaining the cookie in conforming relation to a last or other form with a layer of moldable material applied to its exposed surface comprising a sheet impregnated with a tacky cementitious substance causing the sheet to adhere to said surface, which substance is capable when dry of rendering said sheet stiff and form retaining, and then drying said sheet while the cookie is maintained in conforming relation to said form.

JOHN J. MAGUIRE.